United States Patent
Krausz et al.

(10) Patent No.: US 7,625,018 B2
(45) Date of Patent: Dec. 1, 2009

(54) CAST FLANGE FOR PIPE COUPLINGS

(75) Inventors: Eliezer Krausz, Tel-Aviv (IL); Avi Chiproot, Kfar-Saba (IL)

(73) Assignee: Krausz Metal Industries Ltd., Tel Aviv (IL)

( * ) Notice: Subject to any disclaimer, the term of this patent is extended or adjusted under 35 U.S.C. 154(b) by 5 days.

(21) Appl. No.: 11/706,244

(22) Filed: Feb. 15, 2007

(65) Prior Publication Data

US 2007/0273151 A1 Nov. 29, 2007

(30) Foreign Application Priority Data

May 28, 2006 (IL) .................................... 175971

(51) Int. Cl.
*F16L 21/02* (2006.01)
(52) U.S. Cl. ................ 285/420; 285/367; 285/369
(58) Field of Classification Search ............ 285/417, 285/420, 367, 410, 369
See application file for complete search history.

(56) References Cited

U.S. PATENT DOCUMENTS

| | | | | |
|---|---|---|---|---|
| 3,680,894 | A * | 8/1972 | Young | 285/367 |
| 4,463,975 | A | 8/1984 | McCord | |
| 4,494,780 | A * | 1/1985 | Burnett | 285/148.26 |
| 5,230,537 | A * | 7/1993 | Newman | 285/112 |
| 5,692,544 | A | 12/1997 | Friedrich et al. | |
| 5,941,576 | A * | 8/1999 | Krausz | 285/110 |
| 6,293,556 | B1 * | 9/2001 | Krausz | 277/549 |
| 7,243,955 | B2 * | 7/2007 | Krausz et al. | 285/236 |
| 2001/0008149 | A1 | 7/2001 | D'Auria | |
| 2004/0108010 | A1 | 6/2004 | Gaston et al. | |
| 2004/0118467 | A1 | 6/2004 | Pirart | |

OTHER PUBLICATIONS

Office Action of IL Application No. 175971 mailed on May 24, 2009.

* cited by examiner

*Primary Examiner*—David E Bochna
(74) *Attorney, Agent, or Firm*—Pearl Cohen Zedek Latzer, LLP

(57) ABSTRACT

An end clamp housing for attachment to a cylindrical body, the side end housing being a unitary metal casting comprising; an open annular base element provided with a first, ingoing flange at a first side of the base element and a second ingoing flange at a second side of the base element. The second ingoing flange having a cross-section forming a loop extending outwardly beyond the base element; and a pair of clamp members projecting outwardly from the base element. The clamp members being positioned face to face and having an aperture to allow the insertion of a tightening element which can be operated to reduce the distance between the two ends of the open annular base element and thereby press an annular seal element against the outside of a pipe inserted through the seal clamp housing, which after release of the tightening element returns to its original dimensions.

4 Claims, 6 Drawing Sheets

CAST FLANGE FOR PIPE COUPLINGS

CROSS REFERENCE TO RELATED APPLICATIONS

This application claims the benefit of Israeli application Ser. No. 175971, filed on May 28, 2006 and titled "CAST FLANGE FOR PIPE COUPLINGS".

FIELD AND BACKGROUND OF THE INVENTION

The present invention relates to pipe couplings, and is an improvement on a cast flange for such couplings housing.

More particularly, the invention provides an improved flange and its seal which is attachable to the external surface of a pipe and which can be used to eliminate a small leak if access to a pipe extremity is available. The flange housing is also useful, again in combination with a seal element, for anchoring an adjacent item and for preventing fluid flow along the external surface of the pipe.

Pipe couplings and the clamps associated therewith are well known and have been manufactured by the present inventors for some years. The coupling comprises a central body member and two side clamps. A prior-art clamp is illustrated in FIG. 1. However there has now been found an improved manufacturing method which at the same time allows a design improvement and cost reduction of this item.

No directly relevant US patents were found. A 2-part seal clamp assembly for piping is disclosed by Friedrich et al. in U.S. Pat. No. 5,692,544, the purpose of which is to contain leakage between the large diameter end flanges of adjoining co-axial pipes. Devices intended to seal pipe leaks are seen in US Patent Applications 2001/0008149 by D`auria, No. 2004/0108010 by Gaston et al, and No. 2004/0118467 by Pirart. These disclosures do not however relate to the type of seal clamp which is the subject of the present invention.

A disadvantage of presently known end clamps of the steel band type is that the areas adjacent to the lug of the seal clamp, at each side are unflexible, straight and not concave, when viewed parallel to the seal clamp axis, whereas the seal operates better when pressed inwardly by a concave surface. This defect in band clamps could be due to the nature of bending machines, the first and the last portion of a metal strip being curved not being bent, and remaining as flat as the original metal strip, probably because at the beginning and at the end of the bending process the workpiece is in contact with only 2 of the 3 rollers of the bending machine.

In a coupling of the type seen in FIG. 1 of the prior art design, and also in U.S. Pat. No. 4,463,975 to McCord, a sudden increase in thickness of the band when approaching the area of the lug is seen. This thickness results in sharp loss of flexibility near the lug, the outcome of which is that when in use this section will retain its original flat shape and thus fail to conform to the circular seal. More sealing pressure is thus required before a pressure-tight condition prevails. Applying high sealing pressure delays work on site and shortens the life of the flexible seal.

OBJECTS OF THE INVENTION

It is therefore one of the objects of the present invention to obviate the disadvantages of prior art seal clamps and to provide an improved and lower cost external flange seal clamp housing of the type where the pipe diameter is known in advance, and where access to a pipe end is available.

It is a further object of the present invention to provide a housing the width of which can be controlled more easily to conform accurately to the cross-section of the flexible seal element being held therein.

SUMMARY OF THE INVENTION

The present invention achieves the above objects by providing an end clamp housing for attachment to a cylindrical body, said side end housing being a unitary metal casting comprising:

a) an open annular base element provided with a first, ingoing flange at a first side of said base element and a second ingoing flange at a second side of said base element, said second ingoing flange having a cross-section forming a loop extending outwardly beyond said base element; and b) a pair of clamp members projecting outwardly from said base element, said clamp members being positioned face to face and having an aperture to allow the insertion of a tightening element which can be operated to reduce the distance between the two ends of said open annular base element and thereby press an annular seal element against the outside of a pipe inserted through said seal clamp housing, which after release of said tightening element returns to its original dimensions.

Two such end clamps being used with the cylindrical body of the coupling.

In a preferred embodiment of the present invention there is provided a seal clamp housing as wherein said metal casting is molded from cast iron.

In a further preferred embodiment of the present invention there is provided an end side clamp housing wherein said cast iron is of the nodular type.

In another preferred embodiment of the present invention there is provided a seal clamp housing in combination with a sealing element inserted therein.

A surprising discovery made while research was in progress is that cast iron is a suitable choice for use in casting the seal clamp housing described. As the annular seals are made in fixed diameters according to the outer dimension of standard pipes, there is no need for the housing to be applied to a wide variation of diameters. Cast iron can be cast into the intricate shapes seen in the diagrams. The advantages are:

a) satisfactory corrosion resistance even if left uncoated;

b) cast iron is a similar metal to the steel pipes and steel pipe fittings with which contact could occur, thus eliminating electrochemical corrosion;

c) a material rigid enough to resist sideways pressure of the compressed seal element;

d) excellent long-term retention of elastic properties that ensures spring-back to original dimensions after extended time of use and so allows easy axial removal of the pipe to which it had been clamped; and e) low cost of material and low labor costs in production.

It has been found that the cast-iron flange clamp is no heavier than the sheet steel clamp which it now replaces. This is due to the use of thin walls reinforced by ribs on the outer face of the new clamp body.

It will be further noted that advantage has been taken of the casting process to permanently mark data, such as nominal size, manufacturers name, part number and the like, on the component by integral casting of raised indicia, in a permanent and very cost-effective manner.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 7 is a perspective illustration of an assembled coupling; while

FULL DISCLOSURE OF THE INVENTION

Figure 1:
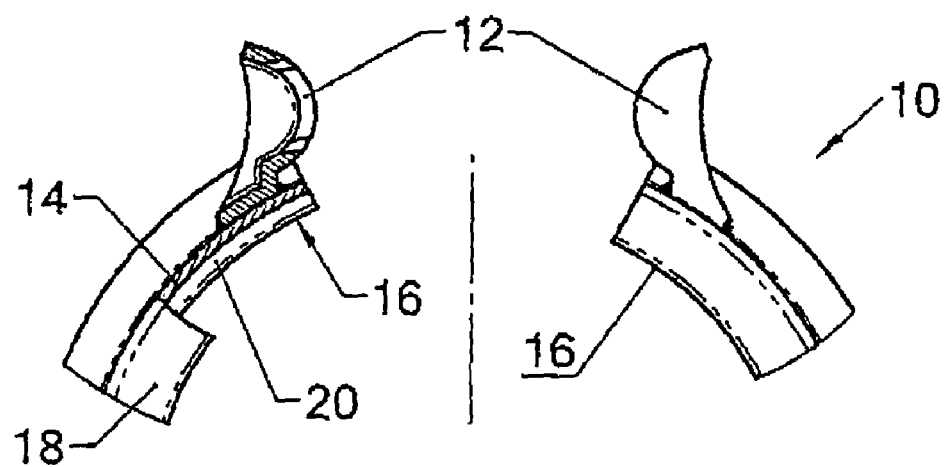
FIG. 1 is a partially-sectioned elevation of a prior-art welded-on first end lug of an end side clamp housing and its non-sectioned second end.

There is seen in FIG. 1 a part of a prior-art seal clamp housing 10 provided with welded-on end lugs 12. The lugs 12 are the source of a sudden increase in thickness of the band 14 when approaching the area of the lugs 12. This thickness results in sharp loss of flexibility near the lug, the outcome of which is that this section 16 retains its original flat shape and thus fails to conform to the shape of the circular seal 18. More sealing pressure is thus required before a pressure-tight condition prevails. The flat portion 16 of the clamp housing 10 also causes a reduction of the maximum diameter pipe which can be inserted in the seal inner diameter.

It has also been observed that the sides of the seal 18 do not contact the inner face of the channel walls 20 in the section proximate to the lugs 12.

Figure 2:
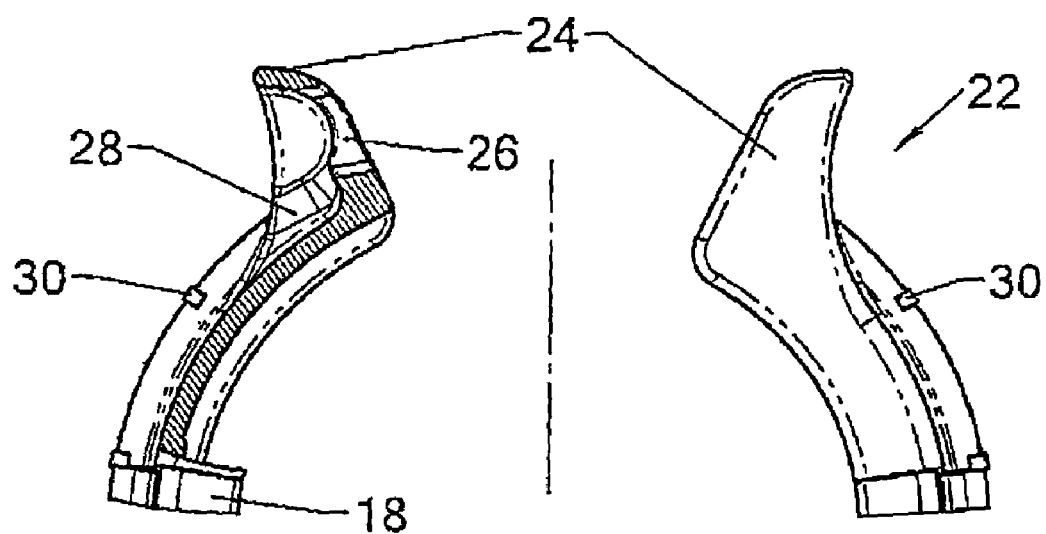
FIG. 2 is a partially-sectioned elevation of a welded first end lug of an end side clamp housing and its non-sectioned second end, according to the invention.
Figure 7:
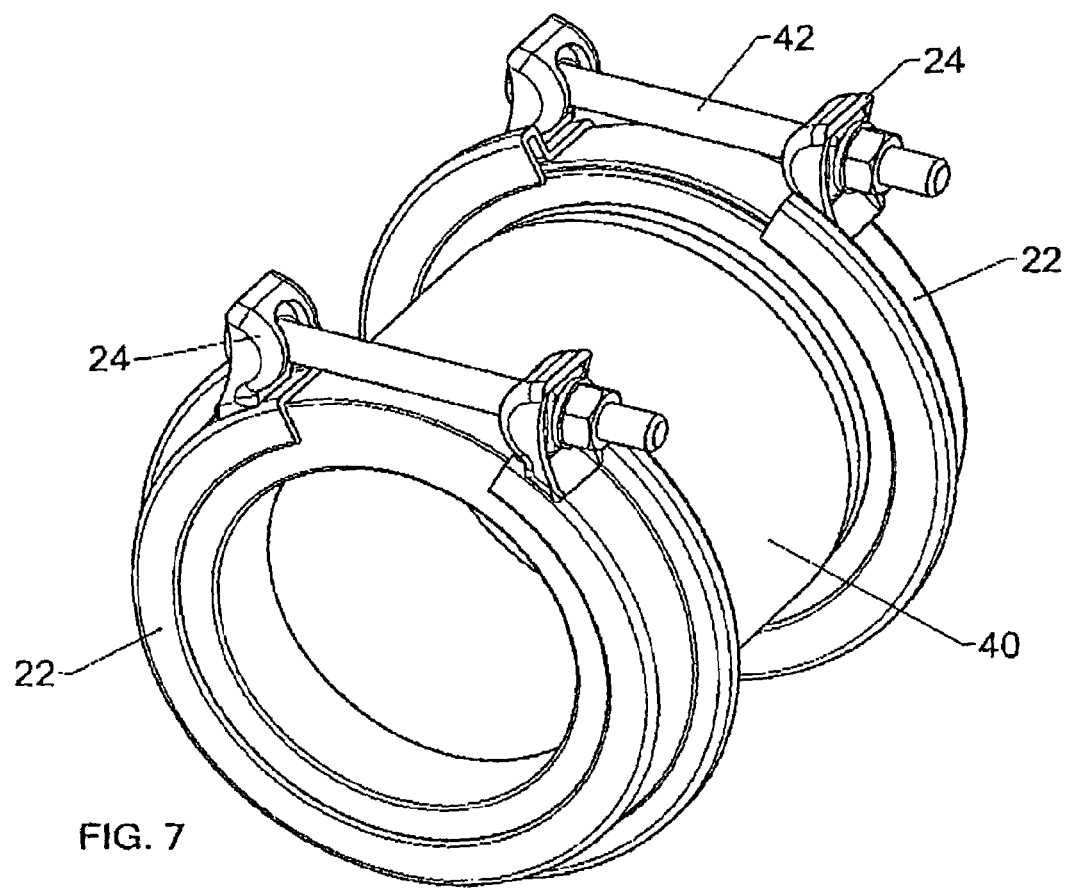

Referring now to FIG. 2, there is seen a preferred embodiment of the flange seal clamp housing 22 according to the invention. In practice two such housing being used as seen in FIG. 7.

The seal clamp housing 22 is seen holding a flexible circular seal 18. These components 22, 18 are used for attachment to a cylindrical body, particularly to a pipe, not seen. The housing 22 is manufactured as a thin-wall unitary metal casting. The walls are reinforced by integral ribs 30.

Figure 6:
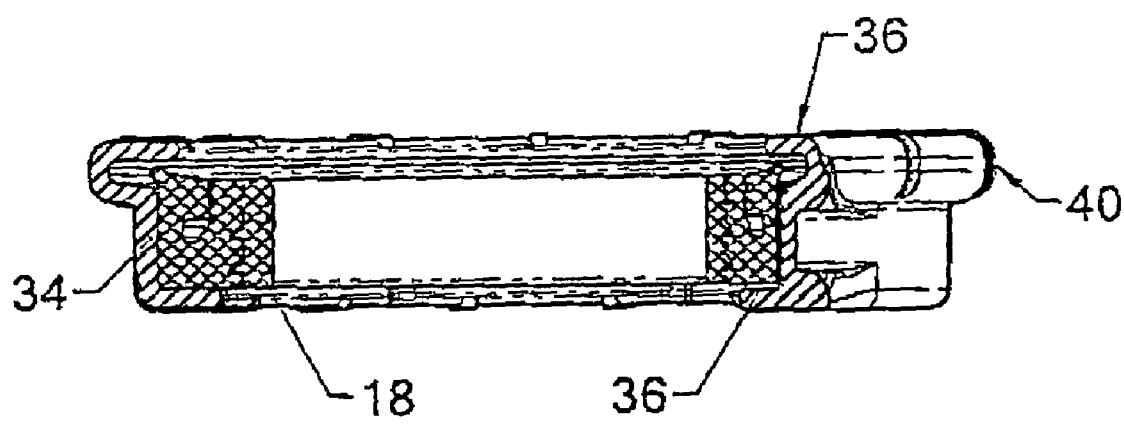
FIG. 6 is a partially-sectioned plan view of the same.
Figure 8:
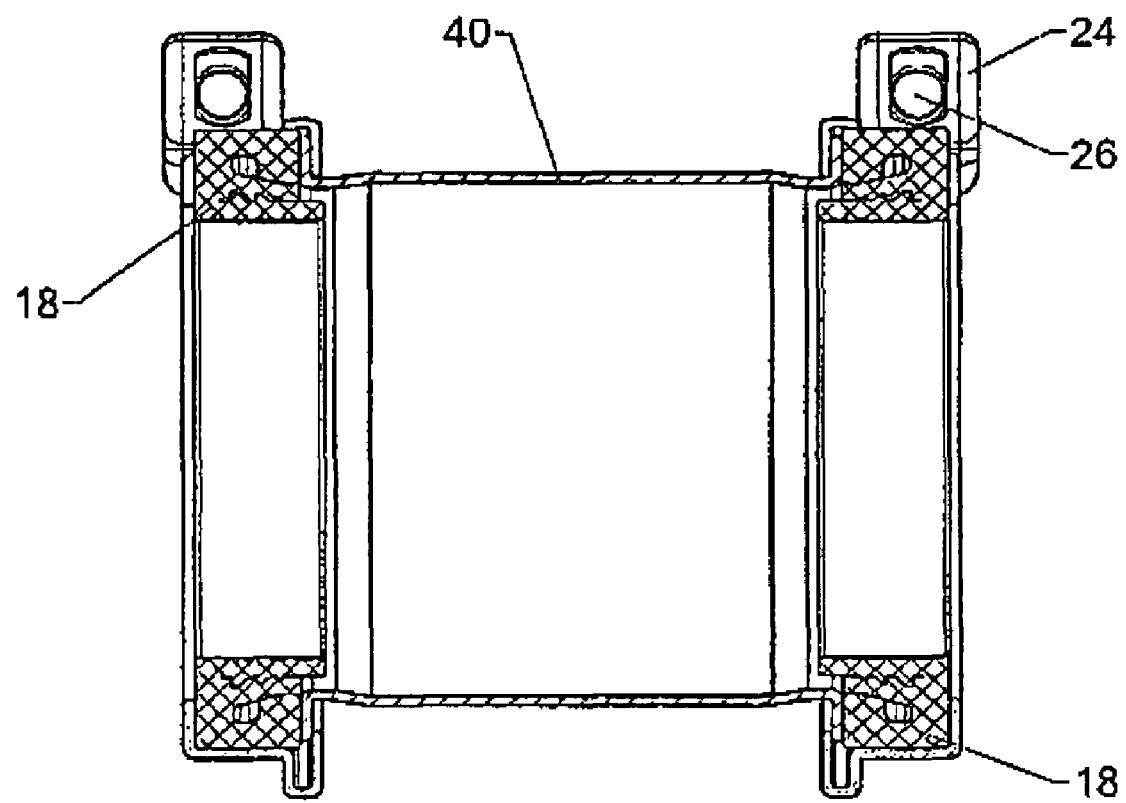
FIG. 8 is a cross section thereof.

Details of the cross-section of the housing 22 will be provided with reference to FIGS. 6 and 8.

A pair of clamp members or lugs 24 project outwardly from the housing extremities. The clamp members 24 are positioned face to face, and each is provided with an aperture 26 to allow the insertion therethrough of a tightening element such as a screw, nut, and washers as seen in FIG. 7. Tightening thereof reduces the distance between the two clamp members 24 and thereby exerts almost 360° radial pressure on the annular seal element 18 against the outside of a cylindrical body or pipe (not seen) inserted through the seal clamp housing 22. On release of the tightening element the housing 22 springs back to its original dimensions to form an opening through which an existing pipe can be removed without obstruction, and a new pipe installed.

The casting method was further utilized to strengthen the clamp members 24, and as a result are now suitable for accepting higher closure forces.

Both clamp members 24 have a reduced thickness area 28, which improves flexibility in this region.

The preferred metal for the casting is cast iron. The nodular type is preferred as being more crack resistant. The advantages of this unusual choice have been detailed previously. Briefly, corrosion resistance, strength, rigidity, low cost and long-term retention of spring-back were the main considerations.

With reference to the rest of the figures, similar reference numerals have been used to identify similar parts.

Figure 3:
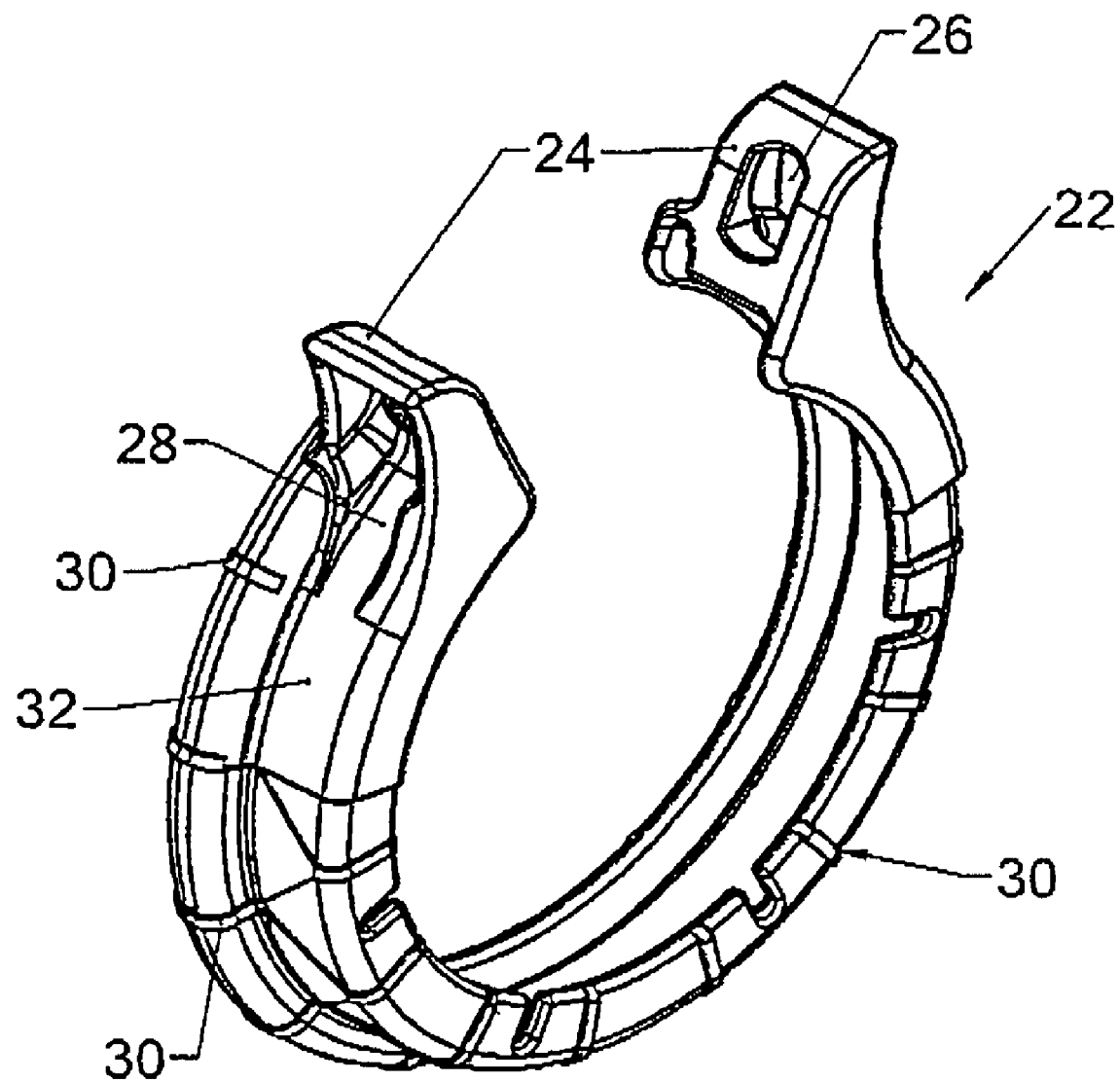
FIG. 3 is a perspective view of a preferred embodiment of the end clamp housing according to the invention.

FIG. 3 illustrates the whole flange housing 22. The reduced thickness area 28 is seen clearly inside a clamp member 24. The figure also shows the strengthening ribs 30 and the marking letters/digits 32 which are integrally cast.

Figure 4:
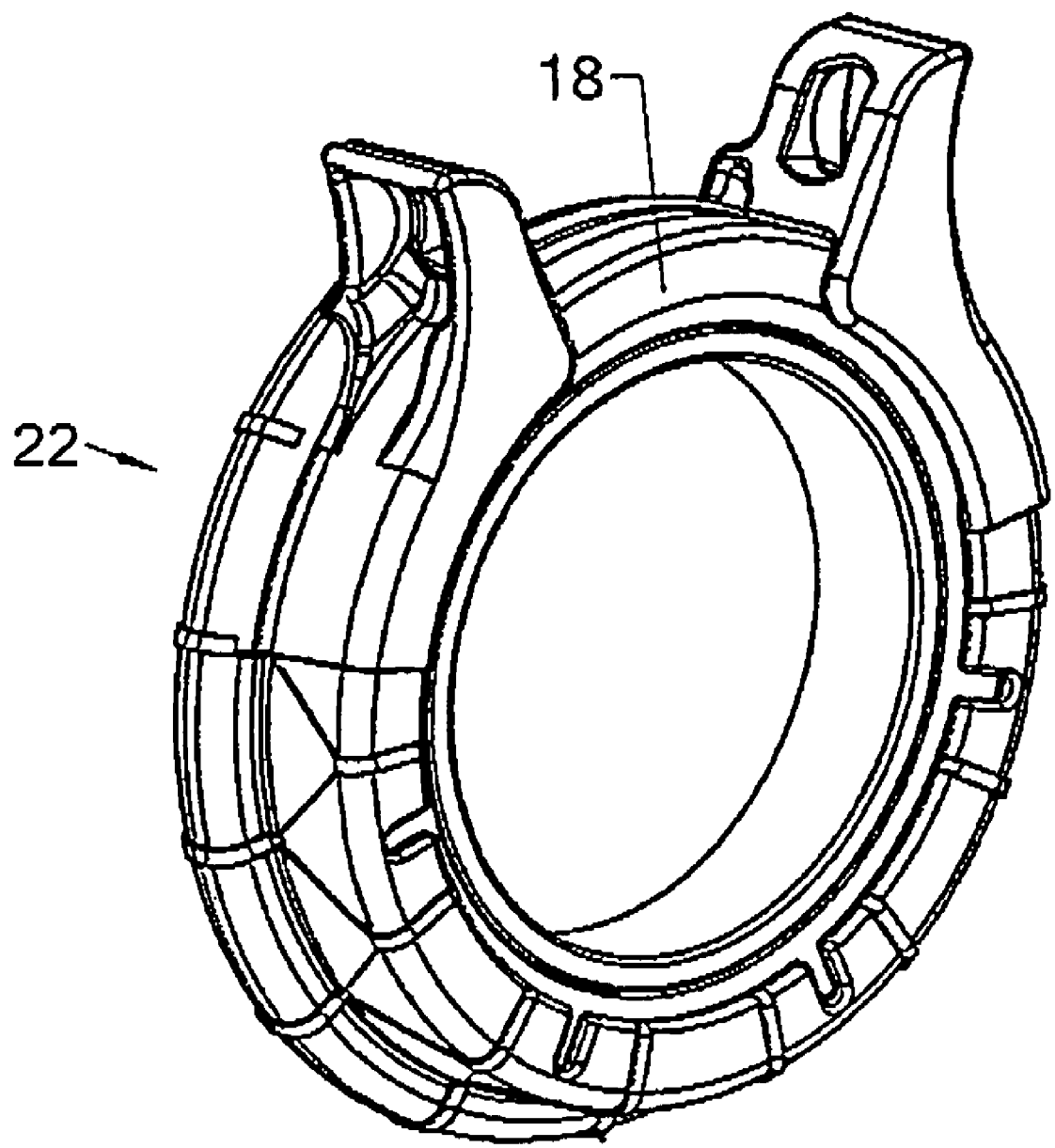
FIG. 4 is a photographic view of the embodiment seen in FIG. 3, wherein the thinned out section in the lug area is seen clearly.
Figure 5:
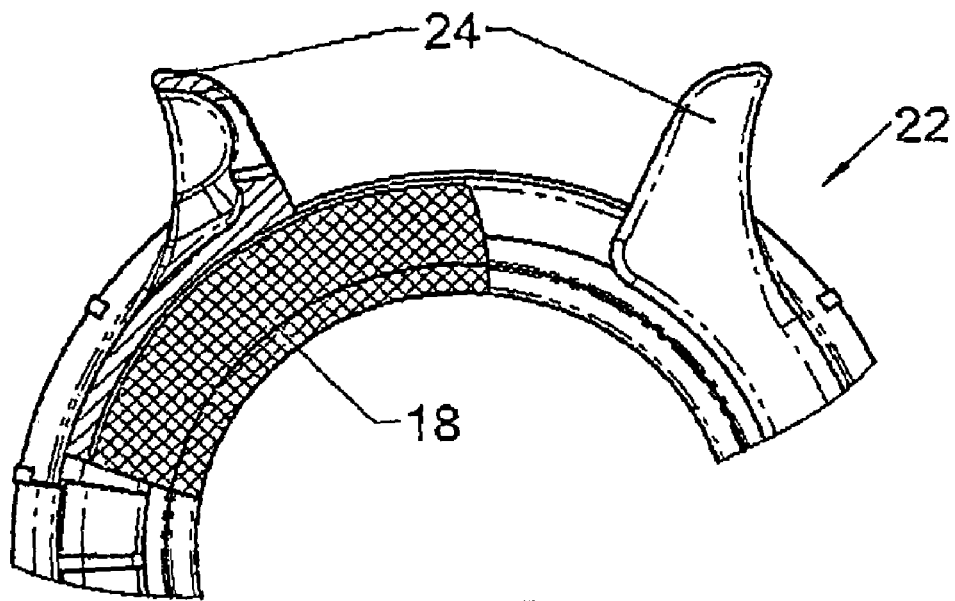
FIG. 5 is a partially-section side view showing a seal element inside the clamp housing.

Turning now to FIG. 4, there is presented a photographic view of the housing 22 carrying a circular seal 18. A more detailed view of the same embodiment is seen in FIG. 5, which shows the seal element 18 inside the clamp housing 22.

With reference now to FIG. 6 there is seen the profile of the clamp housing 22. The profile has an open annular base element 34 provided with a first, ingoing flange 36 at a first side of the base element 34. A second ingoing flange 36 is seen at a second side of the base element 34. A second ingoing flange 38 has a cross-section forming a loop 40 extending outwardly beyond the base element 34.

Referring now to FIGS. 7 and 8 there are seen two side housing 22 being connected to cylindrical body 40 forming the coupling. Lugs 24 are tightened by bolts 42.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

We claim:

1. A flange seal clamp housing for attachment to a cylindrical body, particularly to a pipe, said housing being a unitary metal casting comprising:
   a) an open annular base element provided with a first, ingoing flange at a first side of said base element and a second ingoing flange at a second side of said base element, said second ingoing flange having a cross-section forming a loop extending outwardly beyond said base element;
   b) a pair of clamp members projecting outwardly from said base element, said clamp members being positioned face to face and each having an aperture to allow the insertion of a tightening element therethrough, which can be operated to reduce the distance between the two ends of said open annular base element and thereby press an annular seal element against the outside of a pipe inserted inside said seal clamp housing, said housing after release of said tightening element returning to its original dimensions; and
   c) integral reinforcing ribs across walls of said flange clamp housing.

2. The flange seal clamp housing as claimed in claim 1, wherein said metal casting is molded from cast iron.

3. The flange seal clamp housing as claimed in claim 2, wherein said cast iron is of the nodular type.

4. The flange seal clamp housing as claimed in claim 1, in combination with a sealing element inserted therein.

* * * * *